J. E. STIEGELMEYER.
AUTOMATIC CONTROL FOR STEAM AND ELECTRIC RAILWAYS.
APPLICATION FILED SEPT. 19, 1918.

1,362,445.

Patented Dec. 14, 1920.
10 SHEETS—SHEET 2.

Witness
Frank A. Sable

John E. Stiegelmeyer,
Inventor

Hood & Selby
Attorneys

J. E. STIEGELMEYER.
AUTOMATIC CONTROL FOR STEAM AND ELECTRIC RAILWAYS.
APPLICATION FILED SEPT. 19, 1918.

1,362,445.  Patented Dec. 14, 1920.
10 SHEETS—SHEET 3.

Witness
Frank A. Sabble

Inventor
John E. Stiegelmeyer,
By
Hood & Schley
Attorneys

J. E. STIEGELMEYER.
AUTOMATIC CONTROL FOR STEAM AND ELECTRIC RAILWAYS.
APPLICATION FILED SEPT. 19, 1918.

1,362,445.

Patented Dec. 14, 1920.

Witness
Frank A. Sahle

Inventor
John E. Stiegelmeyer,
By
Hood & Selley
Attorneys

J. E. STIEGELMEYER.
AUTOMATIC CONTROL FOR STEAM AND ELECTRIC RAILWAYS.
APPLICATION FILED SEPT. 19, 1918.

1,362,445.

Patented Dec. 14, 1920.
10 SHEETS—SHEET 7.

Inventor
John E. Stiegelmeyer,

Attorneys

J. E. STIEGELMEYER.
AUTOMATIC CONTROL FOR STEAM AND ELECTRIC RAILWAYS.
APPLICATION FILED SEPT. 19, 1918.

1,362,445.  
Patented Dec. 14, 1920.  
10 SHEETS—SHEET 9.

Witness  
Frank A. Sable

Inventor  
John E. Stiegelmeyer,  
By Hood & Schley  
Attorneys

UNITED STATES PATENT OFFICE.

JOHN EDWARD STIEGELMEYER, OF INDIANAPOLIS, INDIANA.

AUTOMATIC CONTROL FOR STEAM AND ELECTRIC RAILWAYS.

1,362,445.   Specification of Letters Patent.   Patented Dec. 14, 1920.

Application filed September 19, 1918. Serial No. 254,703.

*To all whom it may concern:*

Be it known that I, JOHN E. STIEGELMEYER, a citizen of the United States, residing at Indianapolis, in the county of Marion and State of Indiana, have invented a new and useful Automatic Control for Steam and Electric Railways, of which the following is a specification.

The object of my invention is to provide an apparatus, coöperatively associated with the throttle valve of a locomotive (or the main controlling lever or member, whatever its character, depending upon whether the locomotive be steam, electric, etc.) by means of which the motive force may be automatically withdrawn independent of any action of the driver, but of such character that the driver may by deliberate and particular manipulation of the apparatus, prevent such automatic action.

A further object of my invention is to provide means by which an appropriate signal, showing the condition of the apparatus and of the track, may be automatically operated in the locomotive cab.

A further object of my invention is to provide mechanism by means of which appropriate portions may be automatically moved into and out of operative condition relative to controlling apparatus along the track, depending upon the direction of movement of the locomotive.

A further object of my invention is to so mount the apparatus, or an essential portion of it, that any breakage or loosening of the fastening members will cause an automatic withdrawal of motive force from the locomotive.

Further objects will appear from the detailed description and claims.

The accompanying drawings illustrate my invention. Fig. 2 a detail in partial section of the apparatus immediately employed for automatically shifting the main control member of the locomotive, this member, in the present instance, being shown as the steam throttle valve commonly employed. This apparatus is more fully shown in U. S. Patents Nos. 871,375 and 828,344; Fig. 2ª is a section of the cylinder in Fig. 2; Fig. 15ª a plan of the parts shown in Fig. 15; Fig. 19ª a plan of the parts shown in Fig. 19.

Figure 1:
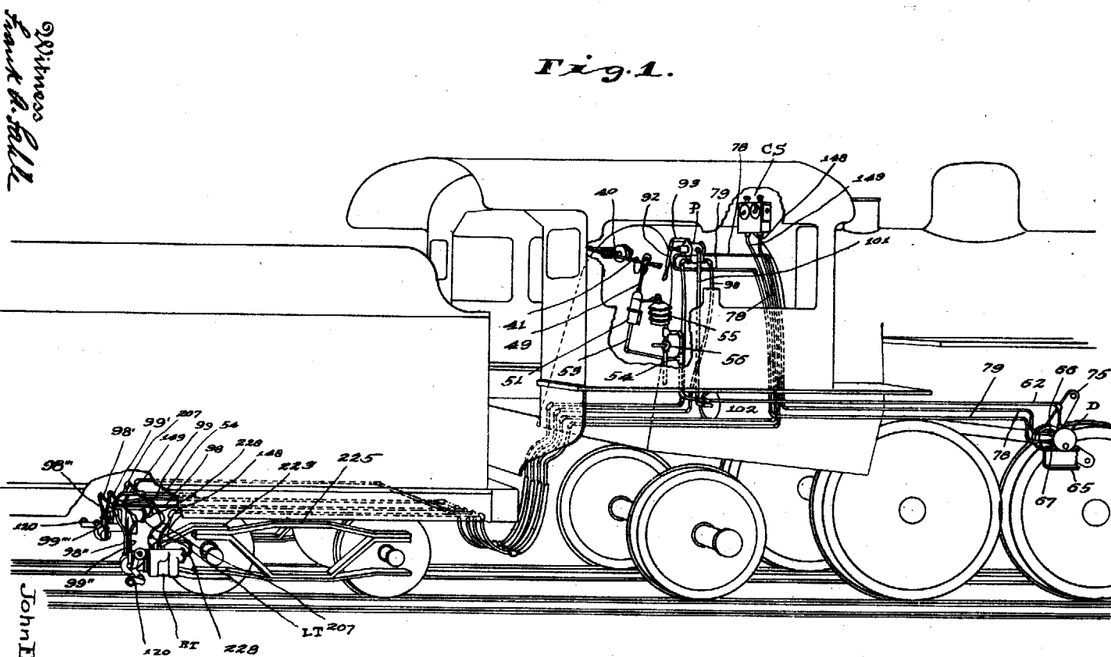
Figure 1 is a diagram of the arrangement of apparatus in and on the locomotive.
Figures 2, 2A:
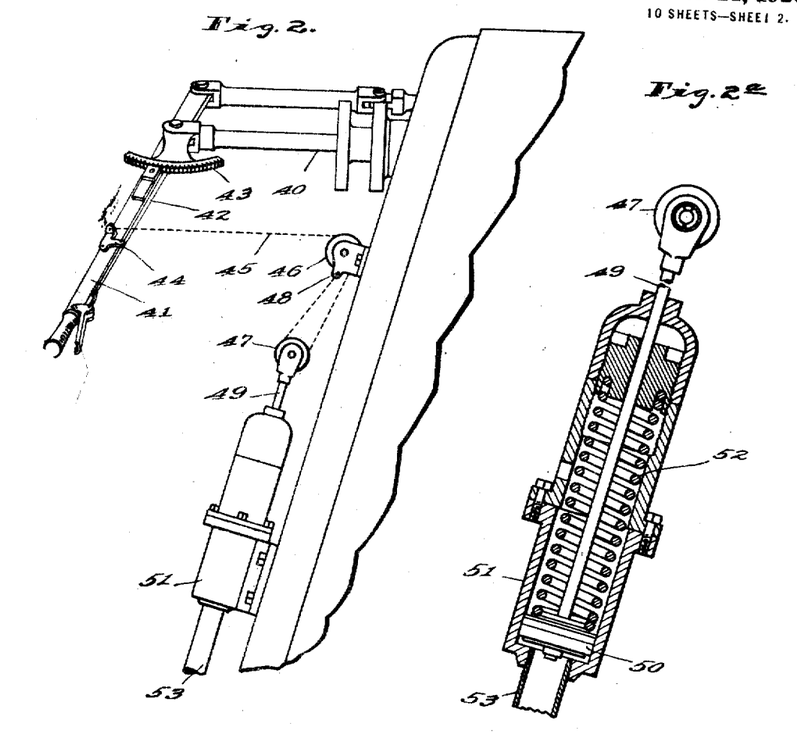

*The automatic shift for main control lever.*—Pivoted to the sliding stem 40 of the throttle valve (see Figs. 2 and 3) is the usual throttle lever 41 having a spring detent 42 engaging segment 43 in the usual manner. Mounted on lever 41 is a bell crank 44, one arm of which is connected to the detent 42 and the other arm of which is connected to a chain 45 which is passed over pulley 46, thence around pulley 47 and attached at 48. Pulley 47 is journaled in the end of a piston rod 49 carrying a piston 50 mounted in an air cylinder 51 and normally urged in one direction by spring 52. Leading into one end of cylinder 51 is pipe 53 which is connected to the train line pipe 54 (see Fig. 1) at a point between the usual engineer's valve 55 and stop cock 56, the arrangement being such that, so long as normal train line pressure is maintained in cylinder 51, chain 45 will be slacked and lever 41 free to be shifted in either direction by the driver, but, so soon as there is a drop in train line pressure below the strength of spring 52, said spring will operate to draw upon chain 45, retract detent 42 from segment 43 and shift the throttle valve to closed position.

*The direction valve.*—In order to automatically place various portions of the apparatus in proper relative position, depending upon whether the engine is to proceed forwardly or backwardly, I provide a valve D (see Figs. 1, 3 and 4), the position of which is determined by the position of the linkage. Of course if the locomotive is an electric locomotive, there will be no linkage, but there will be an equivalent reversing mechanism, some member of which will be utilized to control the position of my proceed valve.

Figure 3:
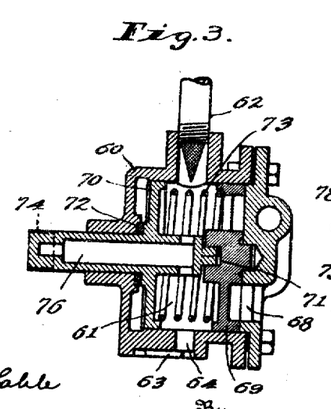
Fig. 3 a section of the direction valve.
Figure 4:
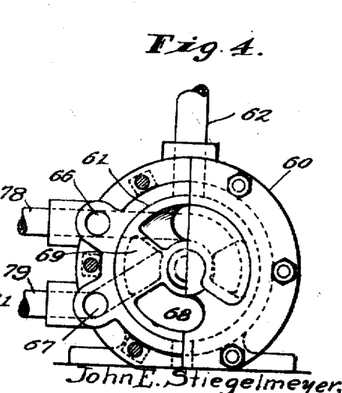
Fig. 4 an elevation in partial section of said valve.

The direction valve P comprises a casing 60, having a valve chamber 61 connected by a pipe 62 with the train line pipe 54 between the engineer's valve 55 and the stop cock 56. Leading from valve chamber 61 into a pocket 63 on one face of casing 60 is a passage 64. The pocket 63 is formed upon a finished face of casing 60 which may be clamped upon a suitable portion 65 of the framework of the locomotive, the arrangement being such that any displacement of this fastening will cause a leak in the train line pipe and thereby cause an automatic closing of the throttle valve and application of brakes.

Leading from chamber 61 are two passages 66 and 67 which are suitably ported into chamber 61 and between which is arranged an exhaust passage 68, leading to atmosphere. Coöperating with the ported inner ends of passages 66 and 67 and exhaust passage 68 is a rotary valve 69 which permits alternate access between the ported ends of passages 66 and 67 and the interior of chamber 61 or exhaust passage 68. Also mounted in chamber 61 is a rotary operating stem 70 having a non-circular connection 71 with valve 69. The stem 70 is journaled in casing 60 and projects therefrom, as shown in Fig. 3. It is packed against leakage by a ring packing 72 which is kept tight by a spring 73 lying between the operating member 70 and valve 69 and holding said valve on its seat which is the ported face of casing 60.

The outer end of stem 70 is formed as indicated at 74 in Fig. 3, so that it may be projected into a diametrical slot formed at the axis of the lever 75 (Fig. 1) of the linkage, the arrangement being such that a swinging of the lever 75 to either extreme of its movement (*i. e.*, for either forward or backward running) will carry valve 69 to its corresponding extreme position and lever 75 will then be free to be shifted toward normal running position without shifting the valve 69.

There is a slight possibility that valve 69 might stick and fail to operate and I, therefore, make the stem 70 hollow, as indicated at 76 and connect this chamber with the interior of chamber 61, the arrangement being such that any abnormal resistance to movement of valve 69 would cause lever 75 to shear or break the end 74 of member 70 and thus cause a leakage from the train line pipe, which would cause a closing of the throttle 40 and application of brakes. Leading from passages 66 and 67 are pipes 78 and 79, respectively, which are connected to the proceed valve.

*The proceed valve.*—In any system of automatic cut off of motive force, due to an entry into an occupied block, it is necessary at times to permit the driver to enter the block. This is the case not only under a system of permissive blocking where a second train may be permitted to run at caution speed in an occupied block, but is absolutely essential in the case of a "pusher" which must, of course, be allowed to enter, and normally operate in, a block section occupied by the train which it is pushing.

Any entry of an occupied block must, of course, be permitted only after the driver has been compelled to perform certain specified manipulations which cannot unintentionally be performed. For this purpose, I provide what I call the proceed valve P.

Valve P (see Figs. 1, 5, 6, 7 and 8) comprises a main casing 80, in which is formed a chamber 81, provided with port passages 82 and 83 and an intermediate exhaust passage 84, with which a D valve 85 coöperates. The chamber 81 has one end closed by a head 86' in which is formed a cylindrical chamber 86. The other end of chamber 81 is closed by a head 87 in which is formed a cylindrical chamber 88. A rod 89 extends through chamber 81 and carries a piston 90 which fits cylinder 86 and a piston 91 which fits chamber 88. An operating lever 92 is pivoted to the outer end of rod 89 and is also pivoted to a link 93 pivoted to casing 80.

Figure 5:
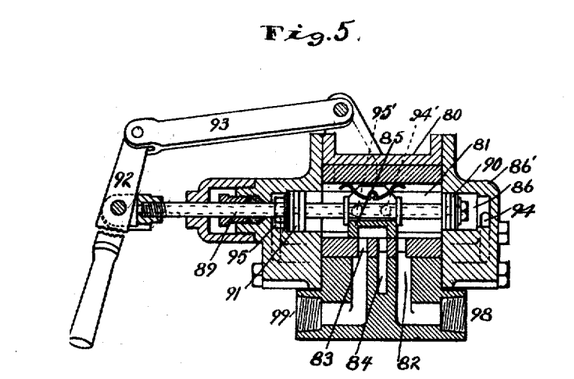
Fig. 5 an axial section of the proceed valve.
Figure 6:
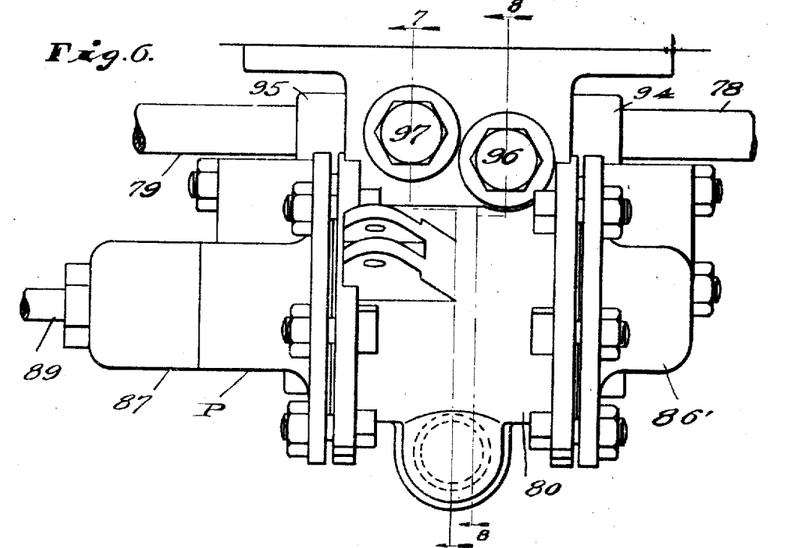
Fig. 6 a plan of said valve.
Figure 7:
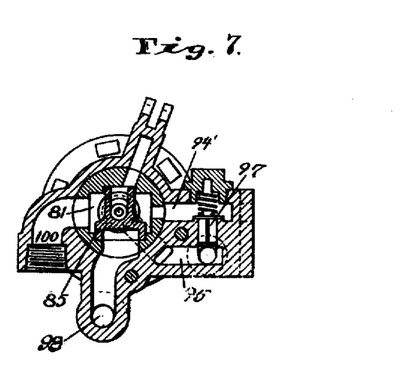
Fig. 7 a section on line 7—7 of Fig. 6.
Figure 8:
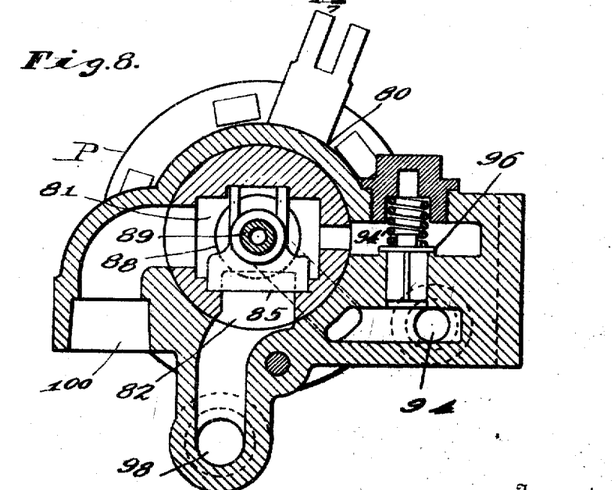
Fig. 8 a section on line 8—8 of Fig. 6.

Pipe 78 is connected to a passage 94 leading into the outer end of cylinder 86 and pipe 79 connects to a similar passage 95, leading into the outer end of cylinder 88. An inwardly opening check valve 96 is arranged in passage 94 and a similarly arranged check valve 97 is in passage 95, said check valves closing communication normally in one direction between said passages 94 and 95, respectively, and the chamber 81, through passages 94' and 95'.

A pipe 98 leads from passage 82 to a cross pipe 98' under the tender and a pipe 99 leads from passage 83 to a similar cross pipe 99'. Leading into chamber 81 is a passage 100 which is connected by a pipe 101 to the proceed-valve auxiliary reservoir 102 which is provided for the purpose of furnishing an adequate volume of air for certain purposes without draining too heavily on the train line.

Figure 11:
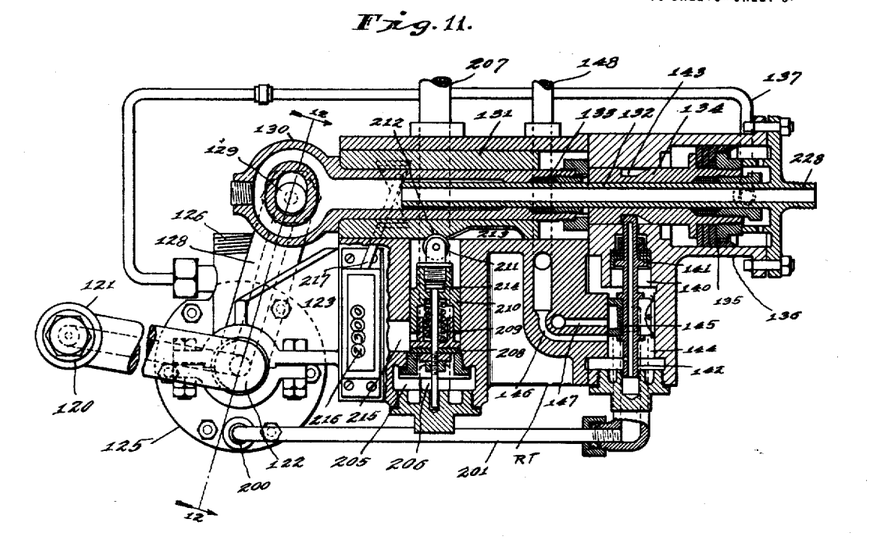
Fig. 11 a section of the righthand trip device.
Figure 12:
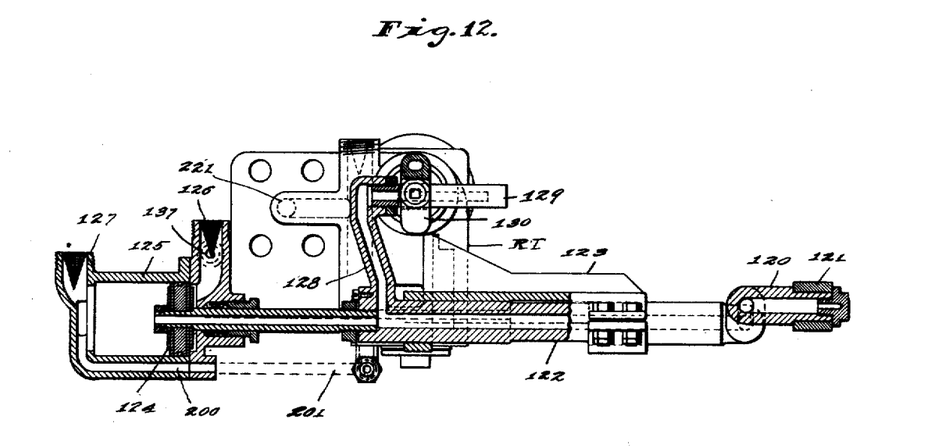
Fig. 12 a section on line 12—12 of Fig. 11.

*The trip devices.*—Mounted upon the forward truck of the tender are two trip devices, RT and LT, at the right and left, respectively. These trip devices are identical except that one is righthand and the other lefthand, so that, in most particulars, a description of one of these devices will be sufficient. Referring now to Figs. 11 and 12 particularly, the righthand trip device RT. The trip device comprises a laterally-projectable finger 120 which is arranged horizontally at right angles to the track line. Finger 120 carries a roller 121. Finger 120 is carried by a shaft 122 which is rotatable and axially shiftable in the main casing 123 of the trip device and carries, at one end, a piston 124 which is mounted in a cylinder 125 provided with pipe connections 126 and 127 at opposite ends of the cylinder. Shaft 122 carries an arm 128 which, at its outer end, carries a finger 129 arranged parallel with the axis of the shaft 122 and having an axial extent enough greater than the axial play of shaft 122 to compensate such movement. Shaft 122 and fingers 120 and 129, as well as arm 128, are hollow and receive air from cylinder 125 so that, in case of breakage, there will be a drain on train line pressure sufficient to cause a closing of the throttle valve and brake application.

Finger 129 is projected transversely through a plunger 130 which is slidably mounted in a sleeve 131 slidably mounted in the main casing 123. Plunger 130 is hollow and is sleeved over a fixed tube 132 and provided with a packing gland 133 to maintain an air-tight sliding connection with tube 132. Plunger 130 is capable of a limited amount of play independent of sleeve 131.

Sleeved over tube 132 is a tubular piston rod 134 adapted to engage plunger 133 and drive it in one direction. Piston rod 134 carries a piston 135 which fits a cylinder 136 which receives air through a pipe 137 which is connected to passage 127. Formed at right angles to cylinder 136 is a cylinder 140 in which is mounted a piston 141 carrying a rod 142. Piston rod 142 is arranged vertically and is supposed to normally assume its lowest position under the action of gravity, but to insure this lower position at proper times, I project the upper end of the rod enough so that when the piston is in its upper position, the rod will project into the bore in which the hollow rod 134 is mounted, an annular cam groove 143 being formed in said tubular rod 134 to permit such projection. Rod 142 lies in a chamber 144 and carries a D valve 145 which co-operates with a passage 146 and an exhaust passage 147, alternately connecting passage 146 with chamber 144 and with exhaust 147. The passage 146 of the trip device RT is connected by a pipe 148 to the cab signal CS and the corresponding passage of the trip device LT is connected by a pipe 149 which also leads to the cab signal CS.

The cross pipe 98' is provided with two extensions 98'' and 98''', extension 98'' leading to passage 126 of the trip device RT, while extension 98''' leads to passage 127 of the trip device LT. Cross pipe 99' is provided with an extension 99'' which connects with passage 127 of the trip device RT, and with an extension 99''' which connects with passage 126 of the trip device LT.

Communicating with passage 126 of each of the trip devices, is a passage 200 connected by a pipe 201 with the interior of chamber 144.

Formed at right angles to the axis of sleeve 131 is a bore 205 into the lower end of which leads a passage 206 which is connected by a pipe 207 with the train line pipe 54. Arranged in bore 205 is an upwardly-presented valve seat, upon which normally rests a valve 208 which is normally urged downward upon its seat by a spring 209 having a movable abutment 210, provided with a roller 211, adapted to seat either in a shallow notch 212 or in a cam groove 213 formed in sleeve 131. There is a connection 214, permitting a limited amount of play, between the stem of valve 208 and the abutment member 210. Leading from bore 205 is an exhaust passage 215 which is uncovered when valve 208 is permitted to rise from its seat.

In order to make a record of each complete actuation of the trip shaft 122, I provide a counter 216 on each trip device and the operating lever 217 of this counter is projected in to engagement with sleeve 131, as indicated in dotted lines in Fig. 11.

Because of the continuous possibility that one or the other of the trip devices may become accidentally displaced, from its fastening on the tender truck, I deem it advisable to provide a support of such character that any displacement or breakage will inevitably result in a closing of the throttle valve and a brake application. Each trip device is, therefore, provided with a finished supporting face 220 which is ported at 221 and bolted upon the face 222 of bracket 223, said bracket being hollow and ported at 224 to register with port 221. Port 221 is connected to the passage to which pipe 207 is connected. Bracket 223 comprises two arms between which the truck frame 225 may be clamped and each of these arms, on its frame-engaging face is provided with a pocket 226 which is in communication with the interior of the bracket, as clearly shown in Fig. 14, and which is normally sealed against communication from atmosphere by gasket 227 and the bolts which serve to clamp the bracket upon the truck frame, the arrangement being such that any breakage of the bracket, or displacement of connection between the trip device and the bracket, or between the bracket and the truck frame, will produce a leakage in the train line pipe, which will cause a closing of the throttle valve and brake application.

In order to cause a similar closing of the throttle valve, in case of improper leakage from the interior of plunger 130, the interior of tube 132 is connected by a pipe 228 with pipe 207.

*The cab signal.* (See Figs. 9 and 10.)—In order that the driver may at all times be advised as to the condition of the apparatus and the track blocks in which his engine is located, I mount the cab signal CS immediately in front of the driver in the locomotive cab. This signal comprises two similar but independent signal units, one for forward movement, and the other for backward movement of the locomotive. Each element comprises a cylinder 230 in which is mounted a piston 231, normally urged in danger direction by a spring 232. The rod 233 of piston 231 is connected to a signal arm 234, the position of which will indicate the condition of the apparatus and track block in which the locomotive is operating.

Figure 9:
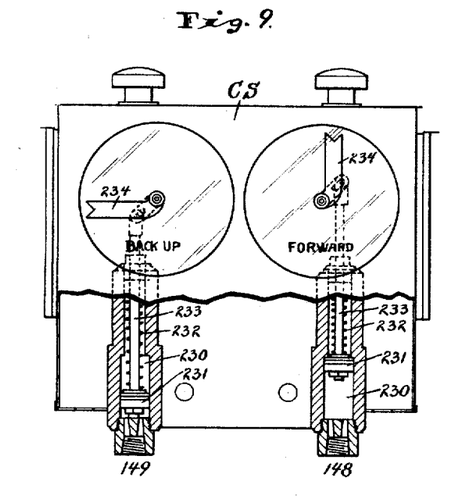
Fig. 9 a front elevation in partial vertical section of the cab signal.
Figure 10:
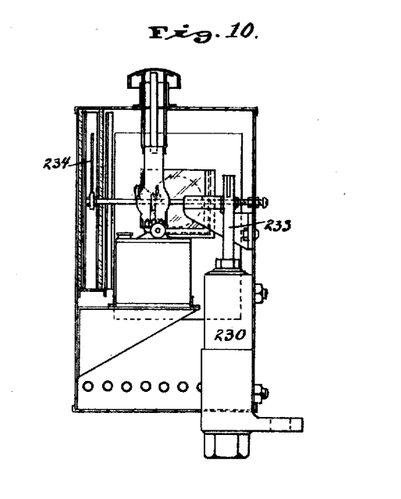
Fig. 10 a side elevation in partial vertical section of the cab signal.

The cylinder 230 of the "forward" indicator is connected to pipe 148, while the cylinder of the "back-up" indicator is connected to pipe 149.

Figure 15:
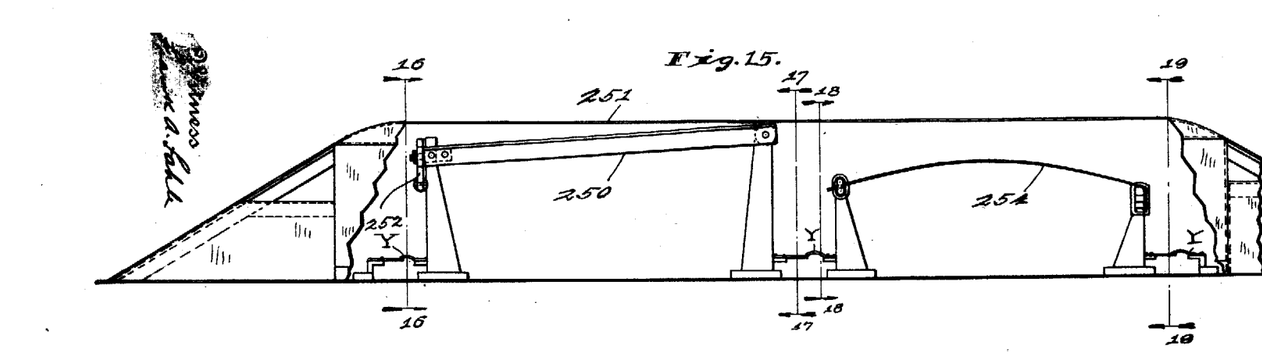
Fig. 15 a side elevation of the blocking rail and clearing rail.
Figure 15A:
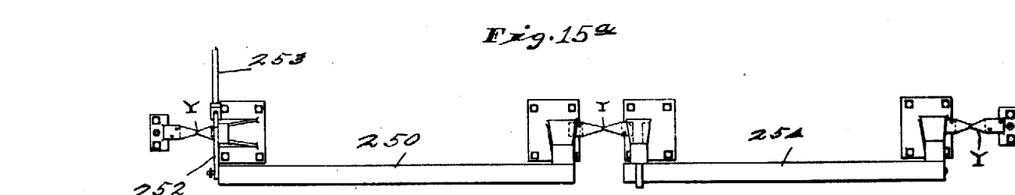
Figure 16:
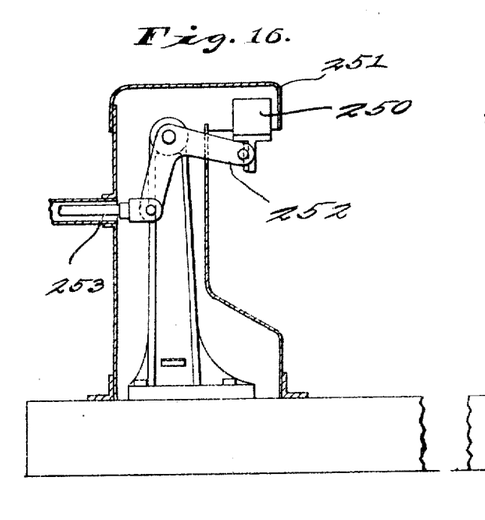
Fig. 16 a section on line 16—16 of Fig. 15.
Figure 17:
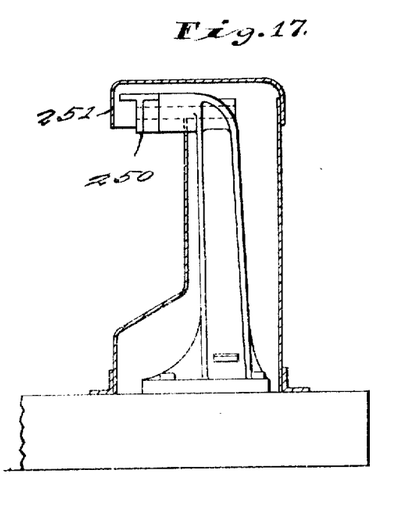
Fig. 17 a section on line 17—17 of Fig. 15.
Figure 18:
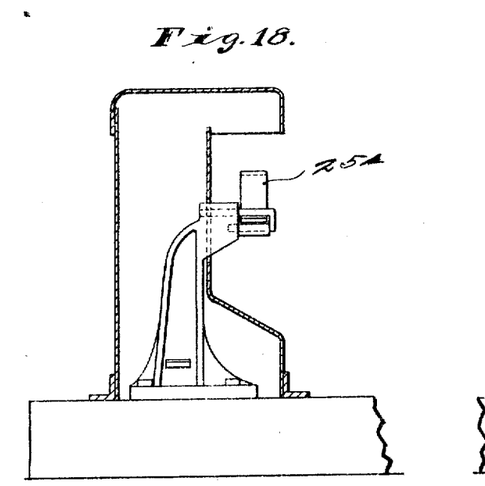
Fig. 18 a section on line 18—18 of Fig. 15.

*The tripping rail.* (See Figs. 15–20.)—Arranged adjacent the entrance end of each block, alongside the preceding block, is a tripping rail 250 which is pivotally supported at one end in a suitable housing 251, and at its forward end, i. e., at the end pointing toward the direction of travel, is capable of a limited vertical movement, being normally supported by one arm of a bell crank 252, the other arm of which is connected by a link 253 with the operating machinery, to be described later, the arrangement being such that when the trip rail 250 is in its dropped position and the corresponding trip device is in operative normal position, the trip device will be swung downwardly by passage beneath the tripping rail, the direction of travel being from right to left in Fig. 15.

Figure 22:
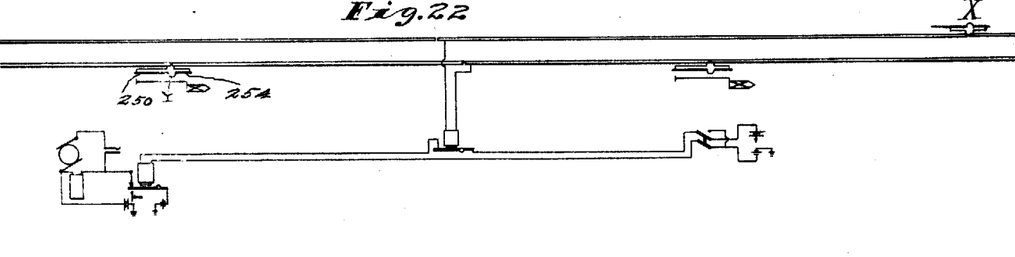
Fig. 22 a wiring diagram of an ordinary block system.

A short distance in advance of the entry end of each tripping rail, I provide a clearing rail 254 which is conveniently in the form of an upwardly bowed spring bar, over which the roller 121 may ride, when properly positioned, as will be hereafter described. In order to insure proper operative relationship of the parts, the clearing rail and tripping rail are arranged in electric series with two aligned rails of a block, as indicated in Fig. 22 at X, and as indicated by the several normally-closed but somewhat easily disrupted connections Y in Fig. 15.

Figure 19:
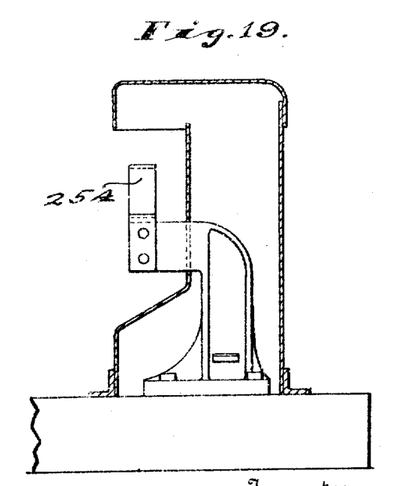
Fig. 19 a section on line 19—19 of Fig. 15.
Figure 19A:
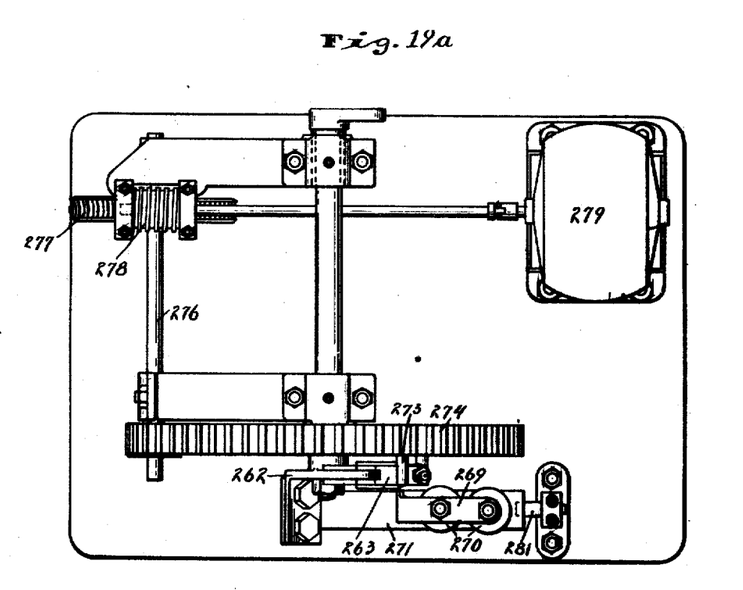
Figure 20:
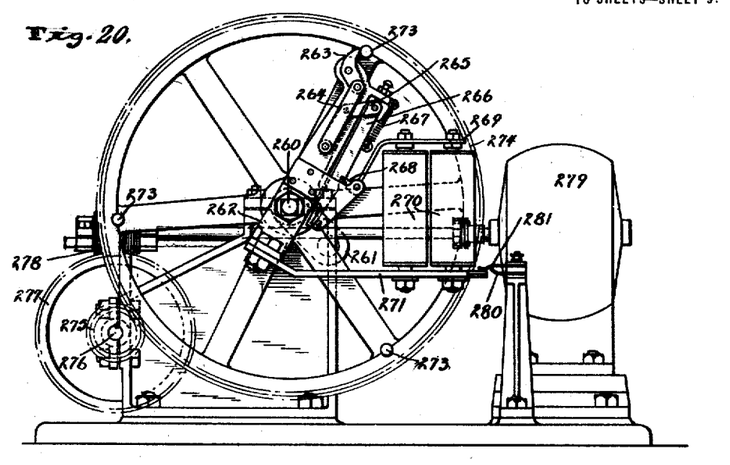
Fig. 20 an elevation of the apparatus for shifting the blocking rail.
Figure 21:
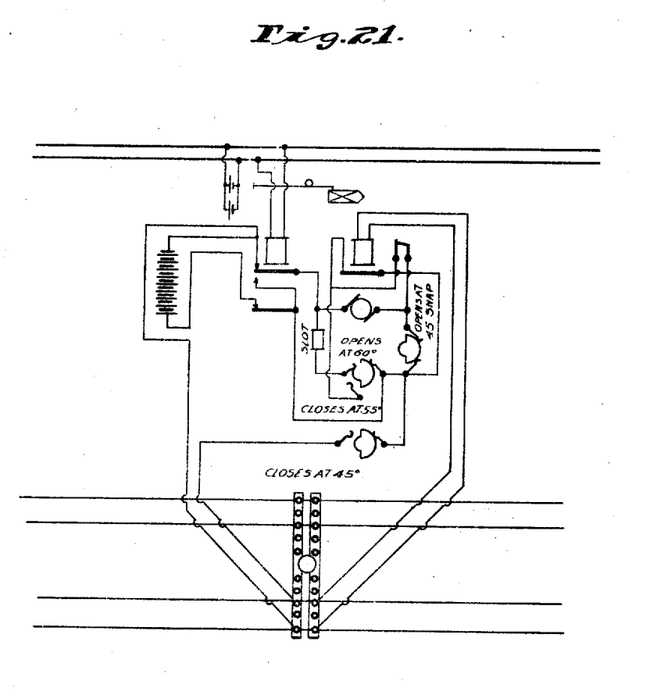
Fig. 21 a wiring diagram of the machine shown in Fig. 20 and the train track.

*The trip rail operating machines.* (See Figs. 19ª and 20.)—The tripping rail is normally held in upper and inoperative position by the catch mechanism of the machine, which is provided for returning it to normal position, but it passes to danger position, i. e., locking position, by the action of gravity upon release of the catch mechanism.

The operating machine comprises a shaft 260 provided with a lever 261 to which link 253 is attached. Secured to shaft 260 is an arm 262 which carries at its outer end a pawl 263 to which is pivoted a link 264 which is, in turn, pivoted to a bell crank 265 pivoted on arm 262. Bell crank 265 is connected to a sliding latch 266 arranged alongside of arm 262 and normally urged in one direction by spring 267. Latch 266 co-operates with a pawl 268 which carries an armature 269 of an electromagnet 270 which is carried by an arm 271 which is secured to and partakes of the movement of arm 262. In the normal position shown in Fig. 20, pawl 263 is engaged and held up by a pin 273 carried by a gear 274 journaled on shaft 260, said gear meshing with a pinion 275 carried by shaft 276 which carries a worm wheel 277 meshing with worm 278 carried by the shaft of an electric motor 279. Connections may be had between shaft 276 and the usual semaphore arms which may be desired at the adjacent block.

The circuit of motor 279 comprises in part the terminals 280 and 281 which are normally held separated by the engagement of arm 271 with terminals 281.

Under normal conditions, the maintenance of a current in the usual closed circuit of a standard blocking circuit will maintain a current in electromagnet 270 and the parts will be held in the position shown in Fig. 20. When, for any reason, the signal circuit is broken, magnets 270 will be deënergized, whereupon, catch 268 will be withdrawn by the action of gravity on the various parts from latch 266 and pawl 263 will be no longer able to hold the parts in position, but, instead, they will drop and arm 261 will swing so as to permit the tripping rail to drop to its operative position, this movement closing terminal 281 upon terminal 280. Whenever the signal circuit is reëstablished, it will act upon the usual relay to close the circuit of motor 279, whereupon, the next following pin 278 will come into engagement with pawl 263 and will raise the parts to normal position, arm 271 coming into engagement with terminal 281 and opening the motor circuit when the parts have resumed complete normality.

*The operation.*—Assuming the reversing lever of a locomotive to be set for forward motion, the direction valve 69 will be set so as to establish communication between train line and pipe 78 and between pipe 79 and atmosphere. Upon the establishment of train line pressure in the system, the following conditions will be set up:

Train line pressure entering cylinder 86 through passage 94 will push piston rod 89 to the left (Fig. 5) and set the D valve 85 in the position shown. Train line pressure will exist in chamber 81 by reason of a lifting of valve 96. This train line pressure will pass from chamber 81 through passage 82 into pipe 98 and will also pass through passage 100 and pipe 101 into the proceed auxiliary reservoir 102. Any possibility of pressure within passage 83 and the associated parts will be prevented by reason of its connection through the D valve 85 with the atmosphere passage 84. The pressure flowing through pipe 98 and cross pipe 98' (Fig. 1) will pass through branch 98'' into passage 126 of the righthand trip device RT and at the same time will pass through extension 98''' into passage 127 of the lefthand trip device LT. Piston 124 of trip device RT will be projected to the position shown in Fig. 12, while the corresponding piston of the left hand trip device LT, due to the entry of pressure through passage 127 of that device, will be shifted to the opposite position in cylinder 125. As a consequence, the trip finger 120 of device RT will be projected laterally into the line of the tripping rails, while the corresponding finger of the device LT will be held inwardly and therefore out of line of the tripping rails on the left hand side of the track.

In the lefthand tripping device LT, pressure having been received in cylinder 125 through passage 127, that pressure will also pass through pipe 137 into cylinder 136 and will shift piston 135 to the left (Fig. 11), this movement shifting hollow plunger 130 to the left and swinging shaft 122 of device LT through a small angle, so as to move finger 120 of device LT downwardly a small portion of its possible stroke, but not sufficient to clear it from possible actuation by any trip devices whenever the finger 120 of device LT is projected laterally into line with the tripping rails.

Train line pressure having entered cylinder 125 of device RT through passage 126, passes through passage 200 and pipe 201 into chamber 144 and piston 140, so as to raise valve 145 of device RT to the position shown in Fig. 11, thus permitting train line pressure to pass through passage 146 and pipe 148 to the righthand or "forward" indicator of cab signal CS and shift its signal arm to the clear position, as shown in Fig. 9. No train line pressure having been permitted to enter through pipe 149, the spring of the "back-up" indicator of cab signal CS will carry that arm to danger. Train line pressure will also pass from train line pipe 54 through pipe 207 and passage 206 into bore 205 below the seat of valve 208, but said valve is held against the action of this train line pressure by a spring 209 and the abutment 210, roller 211 of which lies in notch 212 of sleeve 131.

Figures 13, 14:
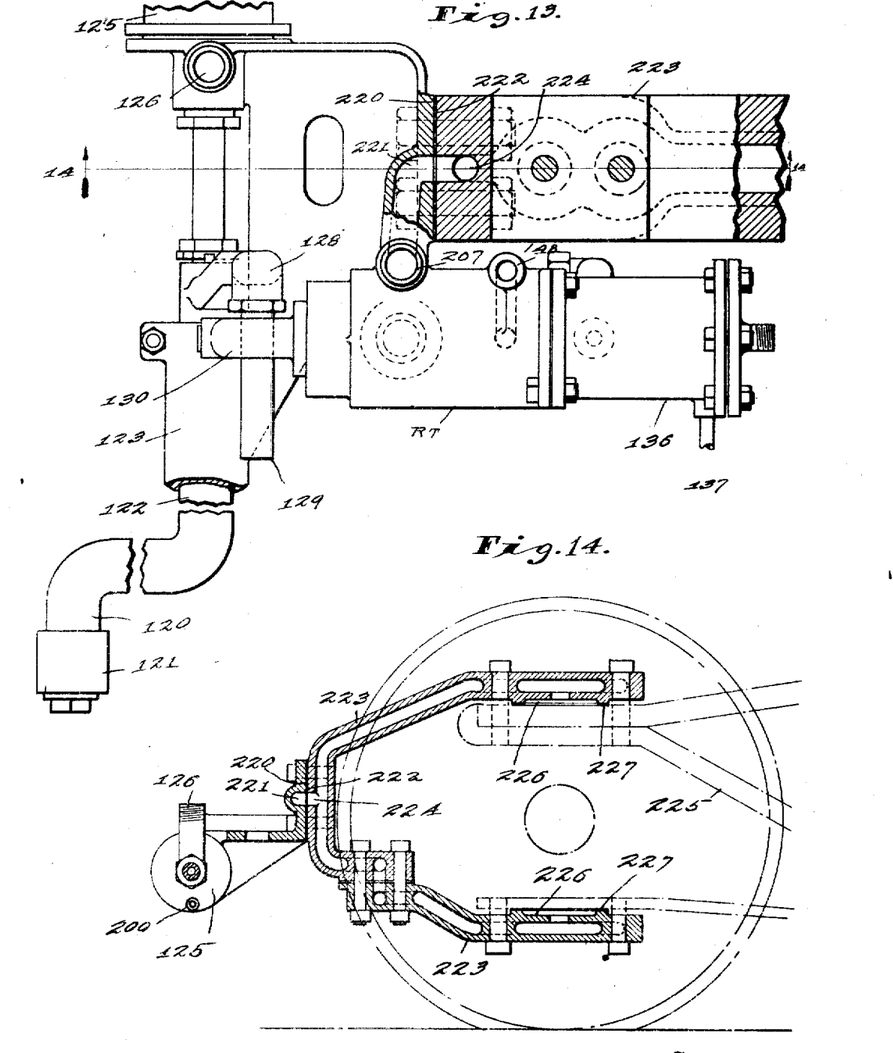
Fig. 13 a partial plan of the righthand trip device.
Fig. 14 a vertical section (on a smaller scale) on line 14—14 of Fig. 13 of the bracket by means of which the trip devices are attached to the tender truck.

Train line pressure through pipe 228 will exist within tube 132 and the entry of plunger 130, and will also pass from the lefthand end of cylinder 125 of trip device RT into the interior of shaft 122 of that device. There will also be train line pressure in pocket 63 of the direction valve and the interiors of brackets 223 and pockets 226 (Fig. 14).

If the engineer desires to drive his engine backwardly, he will shift his reversing lever and this will shift lever 75 which, in turn, will shift the direction valve 69 so as to reverse the parts, finger 120 of device RT being drawn inwardly toward the track and finger 120 of device LT being projected outwardly into the line of the tripping rails. This action will cause a limited downward movement of finger 120 of device RT when it is retracted, due to the application of train line pressure into cylinder 136 upon piston 135 of device RT in a manner already described and under these conditions, both of the tripping fingers 120 will be partially depressed. This would cause a depression of valve 145 of device RT and consequent connection of cylinder 230 of the "forward" cab signal with atmosphere, so that its signal arm would drop to danger, thus notifying the driver by a visual signal of the condition of the apparatus.

Returning now to the normal operation with the engine proceeding forwardly, and assuming that the engine is approaching a block which has been set against the driver, but into which the driver may proceed with caution: If he proceeds without any manipulation of the apparatus, the finger 120 of the righthand trip device RT will come into engagement with the tripping rail and be by it depressed to the full extent of its movement, this action bringing the inner end of plunger 130 into engagement with sleeve 131 and bringing cam slot 213 into line with roller 211, thus relieving the pressure upon spring 209 and permitting the train line pressure to escape from passage 206 through exhaust 215, thereupon releasing the pressure within cylinder 51 and permitting spring 52 to tighten up upon chain 45 and close throttle 40, at the same time making an application of the brakes in the usual manner, due to train line pressure reduction. Whenever one of the tripping device fingers 120 has been depressed by a tripping rail, it cannot be again returned to normal except by either manual manipulation or by engagement with a clearing rail.

If, however, the driver desires to proceed into a block which has been set against him and is proceeding forwardly, he will press forwardly upon lever 92 of the proceed valve. This will shift valve 85, in opposition to the train line pressure, which exists in cylinder 86, so as to connect passage 82 with atmosphere and passage 83 with the interior of chamber 81, and consequently, with train line pressure. This will produce upon the trip devices RT and LT exactly the same effect as would be produced by a shifting of the direction valve, as already described, retracting the finger 120 of device RT and projecting finger 120 of device LT. The projection of the finger 120 of device LT has no effect because there would be no tripping rail at the lefthand side in this vicinity, but the retraction of the finger 120 of the device RT will shift this finger out of line of the tripping rail and permit the locomotive to pass the danger-set tripping rail without any actuation. The retraction of the finger 120 of device RT is accomplished, however, by a flow of train line pressure through extension 99'' into passage 127 of device RT and consequently, there will be a flow of train line pressure through pipe 137 of device RT into cylinder 136, so that piston 135 of this device will be shifted and cam 143 will engage rod 142 and shift valve 145 of device RT downwardly, so as to connect passage 146 with the atmosphere passage 147 so as to exhaust the train line pressure which existed in cylinder 230 of the "forward" cab signal, and, consequently, this "forward" cab signal will pick up and display in the cab where the driver will see it, the danger signal.

The driver will maintain his pressure upon lever 92 until the tripping device has been passed, whereupon, it may be released and the proceed valve will resume its normal forward running position, as already described, and finger 120 of device RT will be reprojected to operative position and finger 120 of device LT will be retracted to inoperative position. Finger 120 of device RT will then be in a depressed position, with the inner end of its plunger 130 in engagement with sleeve 131. The "forward" cab signal, however, will remain set at danger, because piston 135 of the device RT can only be returned to normal by manual operation, although the return of the proceed valve to its normal forward running position has exhausted the pressure from cylinder 136.

When the driver approaches the next tripping rail, if the block about to be entered is clear, the projected and previously-depressed finger 120 of device RT will come into engagement with the clearing rail 254 and be raised up by the action of that rail so as to return plunger 130 of device RT to its normal position, acting upon piston rod 134 to shift piston 135 to the right (Fig. 11). This will bring cam groove 143 opposite the upper end of rod 142 and permit the train line pressure in cylinder 140 to raise valve 145 and reëstablish communication between the cylinder 230 of the "forward" element of the cab signal and train line pressure, so that this portion of the cab signal will be moved to clear position.

If the oncoming tripping rail is set against the train, the driver must either again manipulate his proceed valve in the manner already described, if he desired to proceed, and if he fails to do so and proceeds nevertheless, there will be an actuation of the apparatus to produce a reduction of train line pressure and an application of the brakes, in the manner already described, by the action of the tripping rail and the "forward" portion of the cab signal will be again set against him. If the driver manipulates the proceed valve in the manner already described to pass this new tripping rail, the cab signal will again pick up the closed signal of that block.

In case of a backward motion of the locomotive, train line pressure will enter cylinder 88 and thus automatically cause the cylinder 86 to be exhausted to atmosphere and rod 89 to move to the right (Fig. 5) thus automatically setting up the condition opposite to that shown in Fig. 5. This will shift operating lever 92 to the opposite position, so that when the driver desires to proceed against a block in a rearward direction, he will pull back upon lever 92 to accomplish that result, the action being the same in effect as that already described.

In case of any breakage of any of the parts, as already described, there will be an inevitable leakage of train line pressure, which will operate to close the throttle valve and set the brakes.

It will be noted that with the construction which has been described, any attempt to pass a block without special and intentional manipulation of the apparatus, will inevitably result in a closing of the throttle valve and a setting of the brakes; that any abnormal condition in the track circuit will result in a gravity movement of the tripping rail to tripping position, and a consequent automatic closing of the throttle valve and setting of the brakes if the block is unintentionally entered; that any intentional and deliberate manipulation of the apparatus, in order to pass a tripping rail which has been set in blocking condition, will automatically produce in the locomotive cab an indication showing that a block has been intentionally entered and that this signal does not become obliterated except as a result of a deliberate resetting of the apparatus manually at a point distant from the cab, or by an automatic resetting as a result of passing into a clear block; and that any disarrangement of the apparatus, resulting from accident or intentional mutilation, will result in a condition which will cause a closing of the throttle valve and a setting of the brakes, thus putting the driver under notice of an abnormal condition which requires remedy before procedure.

I claim as my invention:

1. An automatic locomotive control comprising a member controlling the motive force manually, an air cylinder and piston, a connection between said cylinder and train line, means under the control of said piston for shifting the motive-force controller to closed position upon absence of train line pressure in said cylinder, a direction valve, a proceed valve comprising a shiftable valve member and means by which said valve member may be manually positioned, a train line connection leading to the direction valve, air connections between the direction valve and the proceed valve by which the proceed valve will be automatically controlled by the direction valve, two trip devices one upon either side of the track line and each comprising a trip member protectable into and out of operative position, pressure controlled means for shifting said trip members, and connections between said pressure controlled means and the proceed valve, an indicator in the locomotive cab for indicating forward-travel conditions, an indicator in the cab for indicating backward-travel conditions, pressure controlled means for shifting said indicators to safety position, means independent of train line pressure for shifting said indicators to danger position in the absence of train line pressure, and connection between said indicators and the respective pressure-controlled means of the trip devices.

2. An automatic locomotive control comprising a motive force control, a manually-controlled member for controlling said motive-force control, a pressure-controlled means acting upon said manually-controlled member for closing the motive force control in the absence of train line pressure, trip mechanism actuatable by means arranged alongside the track for causing a withdrawal of train line pressure, pressure-controlled means for shifting said trip mechanism into and out of active coöperation with said track means, and a proceed valve comprising manually-controlled means for reversing the normal pressure effect on the pressure-controlled trip shifting means.

3. An automatic locomotive control comprising a motive force controller, a manually-controlled member for controlling said motive-force controller, a pressure-controlled means acting upon said manually-controlled member for closing the motive-force-controller in the absence of train line pressure, trip mechanism actuatable by means arranged alongside the track for causing a withdrawal of train line pressure, pressure-controlled means for shifting said trip mechanism into and out of active coöperation with said track means, a proceed valve comprising manually-controlled means for reversing the normal pressure effect on the pressure-controlled trip shifting means, and signal mechanism in the cab for indicating the fact of proceed valve manipulation.

4. An automatic locomotive control comprising a motive force controller, means for normally manually operating said controller, train-line pressure controlled means comprising an independent motor for preventing manual manipulation of the motive force controller in the absence of train line pressure, trip mechanism operable by track conditions for automatically decreasing train line pressure, means under manual control for shifting said trip mechanism into and out of normal operative position, train line pressure controlled means for automatically shifting said trip mechanism into and out of normal operative position, and cab signal means for indicating track conditions avoided by manual manipulation of the manual trip mechanism control.

5. An automatic locomotive control comprising a motive force controller, means for normally manually operating said controller, train-line pressure controlled means comprising an independent motor for preventing manual manipulation of the motive-force-controller in the absence of train line pressure, trip mechanism operable by track conditions for automatically decreasing train line pressure, means under manual control for shifting said trip mechanism into and out of normal operative position, and train line pressure controlled means for automatically shifting said trip mechanism into and out of normal operative position.

6. An automatic locomotive control comprising a proceed valve consisting of a main casing having a valve chamber formed therein, two supply passages ported into said chamber, an exhaust passage also ported into said chamber, a valve adapted to connect said supply passages alternately with the chamber and the exhaust passage, a piston structure to actuate said valve by train line pressure, and manually-controlled means by which said valve may be actuated in a direction opposite to train-line-pressure actuation.

7. An automatic locomotive control comprising a proceed valve consisting of a main casing having a valve chamber formed therein, two supply passages ported into said chamber, an exhaust passage also ported into said chamber, a valve adapted to connect said supply passages alternately with the chamber and the exhaust passage, a piston structure to actuate said valve by train line pressure, manually-controlled means by which said valve may be actuated in a direction opposite to train-line-pressure actuation, and an auxiliary reservoir connected to said chamber.

8. In an automatic locomotive control, a trip mechanism comprising an axially shiftable and angularly rocking trip shaft, a train line pressure holding valve normally held closed, means controlled by a rocking of the trip shaft for releasing said valve, train line pressure controlled indicating means, a valve for controlling flow of train line pressure to said indicating means, train line pressure controlled means for shifting the trip shaft axially, and train line pressure controlled means coördinated with said last-mentioned train line pressure controlled means for rocking the trip shaft in one direction.

9. An automatic locomotive control comprising a trip device consisting of an axially-shiftable rock shaft, a cylinder and piston for shifting said rock shaft axially, connections for admitting train line pressure to opposite ends of said cylinder, a plunger acting upon said rock shaft to rock it in one direction, a piston acting upon said plunger in one direction, a cylinder containing said piston, train line pressure connections at one end of said cylinder, a valve mounted in a train line pressure receiving chamber and coöperating with a discharge passage and an associated exhaust passage, a cylinder and piston structure affected by train line pressure within said chamber for shifting the valve in one direction, connections between said last-mentioned valve and the plunger actuating piston for shifting the valve in opposition to train line pressure, and a train line exhaust valve coacting with the plunger.

10. An automatic locomotive control comprising members having train line pressure receiving cavities, said cavities being normally closed by rigid portions of the supporting framework and normally held closed by clamping means, whereby disturbance of operative relationship of said parts will cause train line pressure reduction.

11. An automatic locomotive control comprising an air brake system having a normally maintained train-line pressure brake system, means for bleeding said line to set the brakes, a cab signal having an indicating member, a train line pressure receiving cylinder and piston controlling movement of said indicating member and connected to the train line, and a motor normally and yieldingly acting upon said cylinder and piston in opposition to train line pressure.

12. In an automatic locomotive control, comprising a movable member for engagement with an operating member alongside the track, a supporting bracket for said movable member, said supporting bracket having train-line pressure-receiving cavities having open ends normally closed by contact with supporting members on a train element, and clamping means for normally holding said bracket in place.

13. In an automatic locomotive control, a supporting bracket comprising two mating hollow arms formed for attachment to a truck frame, said hollow arms having open ends closed by contact with the truck frame and having means for connecting their interiors with train-line-pressure, and a movable controlling member carried by said bracket in position to be operated by an operating member arranged alongside the track.

14. In an automatic locomotive control, a supporting bracket comprising two mating hollow arms formed for attachment to upper and lower surfaces respectively of a truck frame, said hollow arms having open ends closed by contact with the truck frame and with each other and having means for connecting their interiors with train line pressure, and a movable controlling member carried by said bracket in position to be operated by an operating member arranged alongside the track.

15. In an automatic locomotive control, a supporting bracket comprising two mating hollow arms formed for attachment to upper and lower surfaces respectively of a truck frame, said hollow arms having open ends closed by contact with the truck frame, and having means for connecting their interiors with train line pressure, and a movable controlling member carried by said bracket in position to be operated by an operating member arranged alongside the track.

16. In an automatic locomotive control, a supporting bracket comprising two mating hollow arms formed for attachment to a truck frame, said hollow arms having open ends closed by contact with the truck frame and with each other, and having means for connecting their interiors with train line pressure, and a movable controlling member carried by said bracket in position to be operated by an operating member arranged alongside the track.

In witness whereof, I have hereunto set my hand at Indianapolis, Indiana, this seventeenth day of September, A. D. one thousand nine hundred and eighteen.

JOHN EDWARD STIEGELMEYER.